W. E. PUGSLEY.
GO-CART.
APPLICATION FILED JAN. 25, 1912.
1,027,896.
Patented May 28, 1912.
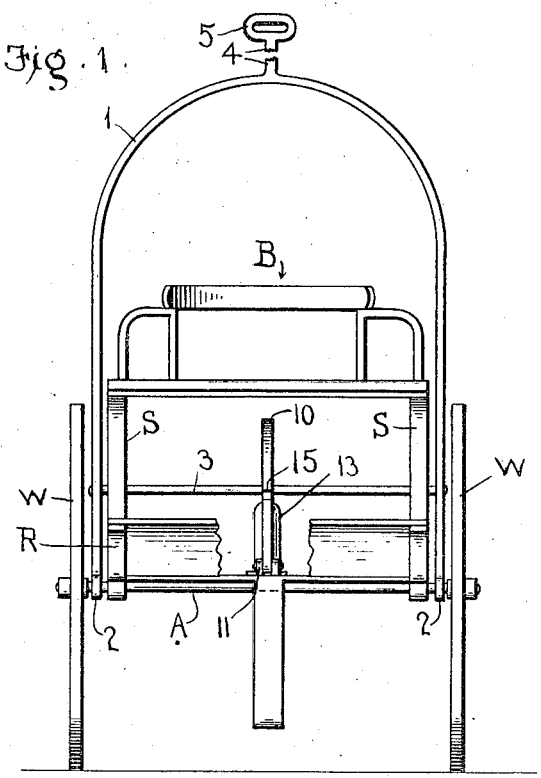
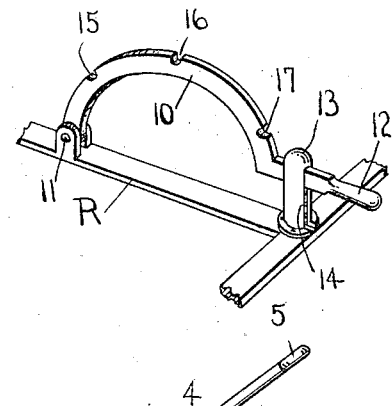
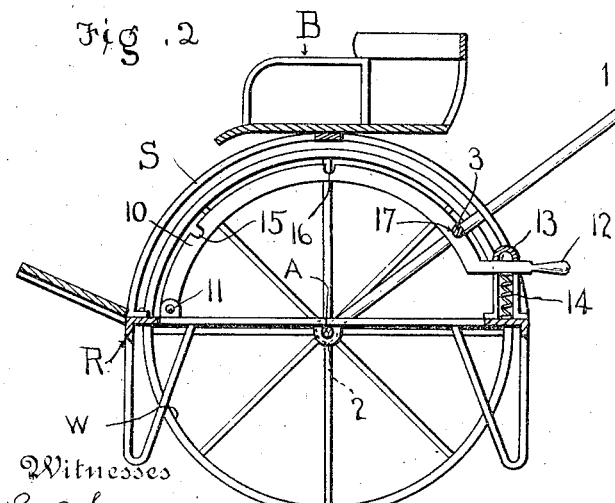
Inventor
W. E. Pugsley
Witnesses
L. B. James
N. L. Coleman
Attorneys

UNITED STATES PATENT OFFICE.

WILLIAM EDWARD PUGSLEY, OF GRAND RAPIDS, MICHIGAN.

GO-CART.

1,027,896.  Specification of Letters Patent.  Patented May 28, 1912.

Application filed January 25, 1912. Serial No. 673,394.

*To all whom it may concern:*

Be it known that I, WILLIAM E. PUGSLEY, a citizen of the United States, residing at Grand Rapids, in the county of Kent and State of Michigan, have invented certain new and useful Improvements in Go-Carts; and I do declare the following to be a full, clear, and exact description of the invention, such as will enable others skilled in the art to which it appertains to make and use the same.

This invention relates to carriages and wagons, and more especially to those intended for the use of children; and the object of the same is to produce an improved go cart whose handle is pivoted upon the axle and capable of swinging over the body of the cart to either the front or rear, and an improved form of latch therefor. This and other objects are accomplished by the construction hereinafter more fully described and claimed, and as shown in the drawings wherein—

Figure 1 is a front elevation of this improved cart with the handle standing upright, showing the same adapted for use as a swing. Fig. 2 is a central vertical longitudinal sectional view through this device with the handle swung to the rear and latched so that the go cart may be pushed forward of the operator. Fig. 3 is an enlarged detail of the latch and the spring supporting its free end.

In the drawings the letter R designates the running gear mounted upon two wheels W which are journaled on the axle A, and B is the body of this improved go-cart which is by preference supported from the running gear by means of two curved springs or arches S, the body including a seat and a foot rest as shown.

Coming now more particularly to the present invention, the handle for this improved device includes a yoke 1 having eyes 2 at its extremities which are journaled upon the axle just inside the wheels W, and a cross rod 3 connecting the arms of the yoke above said eyes and capable of moving under the curved springs S as shown; and the upper portion of the handle is by preference composed of a tongue 4 projecting upward from the center of the yoke and having a hand-hold or loop 5 in its upper extremity by means of which the entire go-cart may be lifted bodily or may be hung upon a hook and used as a swing as shown in Fig. 1. When the go-cart is to be pushed forward of the operator the yoke is swung over to the rear as seen in Fig. 2, and when the go-cart is to be drawn behind the operator it is swung in the opposite direction in a manner which will be clear. For this purpose the size of the yoke is sufficient to permit it to pass entirely over the body and over the head of the child seated in the seat.

The latch for holding the handle in any of its three positions constitutes the principal feature of the present invention. This latch has a curved or arcuate body 10, is pivoted at one end at the point 11 upon the running gear R, and has a handle 12 at the other end projected from its arcuate body on a line radial to the pivot and passing through a slotted upright tube 13 above a coiled expansive spring 14 therein. By preference the arc on which this body is struck is the same as that through which the rod 3 across the yoke swings, or in other words the body 10 is struck on an arc around the center of the axle A, its pivot 11 by preference standing forward and near the foot rest and its handle 12 standing at the rear of the running gear. Finally the outer edge of the arcuate body 10 is provided with three notches 15, 16 and 17.

The parts are of any desired sizes, shapes, proportions and materials, but by preference are made entirely of metal excepting possibly the foot rest and the seat and its cushion. When constructed and assembled as shown and described, the expansive force of the spring 14 holds the handle 12 normally at the upper end of the tube 13 and one of the notches engages with said rod across the yoke, so that the latter is maintained rigidly in the position in which it has been set. When now the operator desires to shift the position, he puts his foot upon the handle 12 or bears down thereon by hand against the tension of the spring 14, so that the notch is disengaged from the rod, after which the yoke is swung to the proper position, and when pressure on the handle 12 is released the spring moves the latch 10 around its pivot 11 in a direction to reëngage one of the other notches with the rod so as to hold the yoke in its adjusted position. Any movement of the handle is communicated direct through the eyes of the yoke to the axle, so that in pushing or pulling or lifting the device, or in steering the go-cart as it is moved along, there is no tendency to disengage the latch from the cross rod. As the seat and foot rest are supported from the running gear entirely independent of the connection between the latch and the yoke, the movements thereof occasioned by the thrashing about of the child are not communicated to the latch. The latching point is well up under the seat where it is not liable to be disturbed, and the tube 13, spring 14, and handle 12 are at the rear where the child cannot even accidentally get his or her foot upon them and trip the connection.

What is claimed as new is:

1. In a go-cart, the combination with the axle mounted on wheels, the running gear carried thereby, arched springs on the running gear, and the body supported by said springs; of a handle including a yoke having eyes at the extremities of its arms mounted loosely on the axle just inside the wheels and a cross rod connecting said arms, an arched latch pivoted at its front end on said running gear and having notches in its body, and a spring holding its rear end normally elevated.

2. In a go-cart, the combination with the axle mounted on wheels, the running gear carried thereby, and a body supported by the running gear; of a handle including a yoke having eyes at the extremities of its arms mounted loosely on the axle and a cross rod connecting said arms, an arcuate latch struck on a center around said axle and having notches in its outer edge adapted to engage said cross rod, a pivot between its front end and the running gear, a handle projecting from its rear end radial to said pivot, a slotted tube on the running gear and through which said handle extends, and an expansive spring within said tube between the running gear and handle.

In testimony whereof I have hereunto set my hand in presence of two subscribing witnesses.

WILLIAM EDWARD PUGSLEY.

Witnesses:
JOHN MULDER,
GARRTTE SLATER.